United States Patent Office 3,546,232
Patented Dec. 8, 1970

3,546,232
3 - PHENYL - 8 - THIANAPHTHENYLALKYL DERIVATIVES OF NORTROPINE AND NORTROPIDINE
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Oct. 25, 1968, Ser. No. 770,799
Int. Cl. C07d 43/06
U.S. Cl. 260—292                                    8 Claims

ABSTRACT OF THE DISCLOSURE 3-phenyl-8-thianaphthenylalkyl or 8-benzofuranylalkyl derivatives of nortropine and nortropidine in which either or both the phenyl and benzoheterocyclic moieties may be substituted by chloro, bromo, fluoro, trifluoromethyl, methyl or methoxy as well as the corresponding lower alkanoyl nortropine esters have neuroleptic activity. The compounds are generally prepared by condensation of a 3-phenylnortropine with an active derivative of the benzoheterocyclic alkanoic acid, such as the acid halide, to give an amide intermediate which is reduced to the 8-substituted alkyl nortropine product. Dehydration of the latter with acid gives the corresponding nortropidine whereas acylation with an appropriate acyl derivative gives the corresponding nortropine ester.

This invention relates to novel 3-phenyl-8-thianaphthenylalkyl or -8-benzofuranylalkyl derivatives of nortropine and nortropidine having useful pharmacodynamic activity. More specifically the compounds of this invention have neuroleptic activity as demonstrated in standard animal pharmacological test procedures. Exemplary of the activity of the compounds of this invention is the decreased motor activity, ptosis, catalepsy and hypotonia produced in rats upon oral administration of 25–100 mg./kg. At these dose levels no toxicity is observed.

The nortropine derivatives of this invention are represented by the following general structural formula:

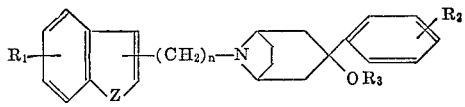

FORMULA I in which:

$R_1$ and $R_2$ each represent hydrogen, chloro, bromo, fluoro, trifluoromethyl, methyl or methoxy;

$R_3$ represents hydrogen or lower alkanoyl of up to 4 carbon atoms;

Z represents sulfur or oxygen; and $n$ represents a positive integer from 2 to 4.

The nortropidine derivatives of this invention are represented by the following general structural formula:

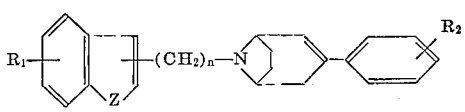

FORMULA II in which $R_1$, $R_2$, Z and $n$ are as defined for Formula I.

Preferred compounds of Formula I and II include those wherein $R_1$ is hydrogen, chloro and fluoro at the 5 or 6-position; $R_2$ is hydrogen, chloro or fluoro at the p-position; $R_3$ is hydrogen or acetyl; Z is sulfur; $n$ is 3 and the benzoheterocyclic moiety is 3-substituted.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, ethanedisulfonic, acetic, oxalic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of this invention are prepared by various methods which are hereinbelow described. Generally they involve condensation of a 3-phenylnortropine with an active derivative of an optionally substituted benzofuran- or thianaphthenenealkanoic acid. Such derivatives may be an anhydride formed with ethyl chloroformate, an acid halide, or a diazoketone. The following reaction scheme illustrates a preferred method of preparation:

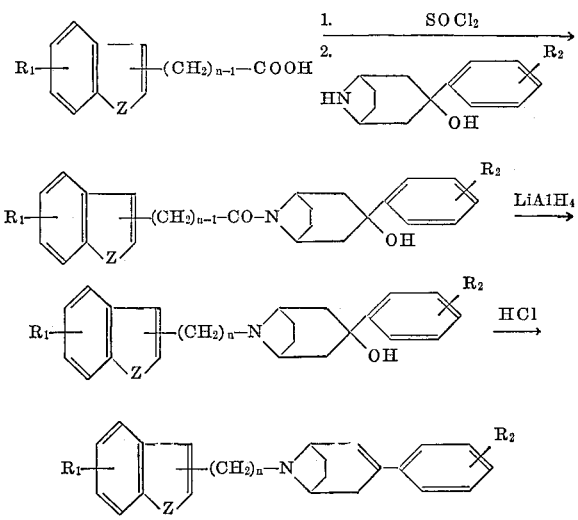

wherein $R_1$, $R_2$, Z and $n$ are as defined above. Thus the alkanoic acid is treated with thionyl chloride to give the acid chloride which is treated with a 3-phenylnortropine to give the intermediate amide. The latter is reduced with, for example, lithium aluminum hydride to give the nortropine product. Dehydration by acid such as a mineral acid, for example hydrochloric acid, yields the corresponding nortropine product.

The compounds of Formula I in which $R_3$ is lower alkanoyl are prepared by acylating the corresponding nortropine in the conventional manner with an anhydride or acyl halide such as acetic anhydride or propionyl chloride.

The alkanoic acids used as starting materials as described above are either known or are prepared from available materials by literature methods. To prepare the products of this invention wherein $n$ is 3, a 2- or 3-halomethylthianaphthene or benzofuran is condensed with diethyl malonate in the presence of a base such as sodium ethoxide or sodium hydride to give a substituted malonic ester which is hydrolyzed with aqueous alkali to give the malonic acid derivative. Decarboxylation of the latter by heating at about 200–250° C. results in the formation of the required substituted propionic acid.

Thianaphthene-3-propionic acid is described in Bull. soc. chem. France 1953, 185–90; 2-chloromethylthianaphthene is described in J. Am. Chem. Soc. 71, 2857

(1949); 2-chloromethylbenzofuran is described in J. Am. Chem. Soc. 73, 440 (1951); 3-chloromethylthianaphthene is described in J. Am. Chem. Soc. 1961, 1291–7; general methods for preparing substituted 2- or 3-halomethylthianaphthenes and benzofurans are described in U.S. Pat. 3,070,606.

The 3-halomethylthianaphthene starting materials are conveniently prepared from substituted thiophenols, as follows:

The substituted thiophenol is dissolved in an aqueous solution containing an equivalent amount of an alkali metal hydroxide, such as sodium or potassium hydroxide, and treated with an equivalent amount of chloroacetone at about 20–25° for 20 to 60 minutes. The reaction mixture is diluted with a water-immiscible solvent such as ether. The organic layer is separated, solvent evaporated and the residue distilled in vacuo to obtain the 1-phenylmercapto-2-propanone. This propanone is cyclized by heating at 160–180° for 30–45 minutes with a dehydrating agent, such as zinc chloride or, preferably, phosphorus pentoxide, to obtain the 3-methylthianaphthene, which is then treated with a halogenating agent such as, preferably, N-bromosuccinimide to give the 3-bromomethylthianaphthene.

The 2-halomethylthianaphthene starting materials are prepared as follows:

An ether solution of the thianaphthene is added to an ether solution containing lithium and butyl bromide, butyl lithium being present in about a four-fold excess, and the mixture refluxed for one to two hours. Approximately a four-fold excess of gaseous formaldehyde is bubbled into the solution over a period of three to five hours. Water and a lower alcohol, such as ethanol, are added; the mixture is made acidic with hydrochloric acid; the ether layer is separated and evaporated to otain the 2-hydroxymethylthianaphthene as the residue, which is purified by recrystallization from a suitable solvent, such as n-heptane. Reaction of the hydroxymethyl compound with a chlorinating agent, such as phosphorus trichloride, phosphorus pentachloride or, preferably, thionyl chloride, yields the starting material, 2-chloromethylthianaphthene.

A 3-halomethylbenzofuran starting material is conveniently prepared by bromination of a 3-methylbenzofuran with at least two molar equivalents of N-bromosuccinimide in the presence of a catalytic amount of benzoyl peroxide to give the 2-bromo-3-bromomethylbenzofuran which is then treated as outlined previously, except that at some point during the reaction sequence, preferably after the decarboxylation, the 2-bromo-3-propionic acid is hydrogenated in the presence of a catalyst such as Raney nickel to remove the 2-bromine.

The 2-halomethylbenzofuran starting materials are prepared from a coumarilic acid by reduction with a bimetallic hydride such as lithium aluminum hydride and chlorination of the resulting 2-hydroxymethylbenzofuran with a chlorinating agent such as phosphorus pentachloride, phosphorus trichloride or, preferably, thionyl chloride.

To prepare the products of this invention wherein $n$ is 2, a halomethylthianaphthene or benzofuran is reacted with an alkali metal cyanide such as sodium cyanide, and the resulting acetonitrile is hydrolyzed with a base such as aqueous potassium hydroxide to give the required acetic acid derivative.

The compounds of the invention wherein $n$ is 4 are prepared by homologating the corresponding propionic acid intermediates through the use of the Arndt-Eistert reaction. The propionic acid is converted to its acid halide, condensed with diazomethane, and the resulting diazoketone treated with a 3-phenylnortropine in the presence of silver oxide to give an amide, which is reduced as described above to the product. Alternatively, the diazoketone is hydrolyzed with aqueous silver oxide to the butyric acid, which is then further reacted.

The 3-phenylnortropine starting materials are either known or are prepared by standard procedures. The following reaction sequence illustrates such a preparation:

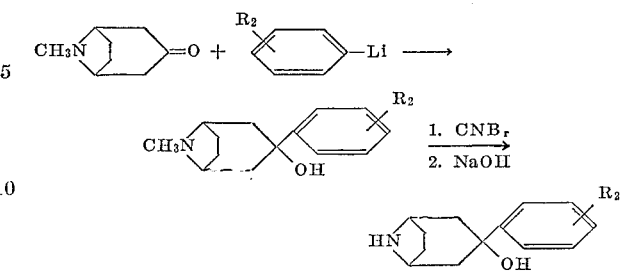

wherein $R_2$ is as defined above. Thus an $R_2$-substituted phenyl lithium (generally obtained from $R_2$-substituted bromobenzene and metallic lithium or n-butyl lithium) is reacted with tropinone, preferably in ether solution, to give the 3-$R_2$-substituted phenyltropine. The latter is demethylated by reaction with cyanogen bromide followed by basic hydrolysis of the resulting cyanamide to give the desired nortropine.

The compounds of this invention may be administered orally or parenterally in conventional dosage unit forms such as tablets, capsules, injectables or the like, by incorporating the appropriate dose of a compound of Formula I or II, either as the free base or an acid addition salt thereof, with carriers according to accepted pharmaceutical practices.

The foregoing is a general description of how to prepare the compounds of this invention. The following examples illustrate the preparation of specific compounds having neuroleptic activity. However this should not be construed as limiting the scope of the invention since appropriate variations in the starting materials will produce other products set forth hereinabove.

PREPARATIONS (A) 5-chloro-2-chloromethylthianaphthene

Dry ether (50 ml.) is added slowly to a cooled solution of 7.925 g. (0.124 moles) of butyl lithium in 80 ml. of hexane under nitrogen. The cooled solution is stirred, a solution of 16.8 g. (0.1 mole) of 5-chlorothianaphthene in 50 ml. of dry ether is added slowly, and the resulting solution is stirred in ice for 2 hours. A 9.5 g. (0.32 mole) sample of paraformaldehyde (dried by heating on the steam bath for 2 hours in vacuo) is placed in an oil bath at about 190°, and the formaldehyde is swept into the reaction mixture with nitrogen. After addition is complete (ca. 1 hour), the mixture is stirred and refluxed for 2–3 hours, and then allowed to stand overnight. The mixture is diluted with 7.5 ml. of ethanol to destroy the remaining butyl lithium and then with ca. 200 ml. of aqueous salt solution. The layers are separated, the aqueous layer is washed with ether, and the combined ethereal extracts are washed, dried, and evaporated in vacuo to give a solid. Trituration with petroleum ether and recrystallization from toluene gives 5-chloro-2-hydroxymethylthianaphthene, M.P. 122–124.5°.

To a stirred solution of 13.0 g. (0.0655 mole) of this compound in 100 ml. of chloroform is added dropwise 12.0 ml. of $SOCl_2$. The resulting mixture is stirred and refluxed for a half hour and then evaporated in vacuo. The residue is dissolved in benzene and again evaporated to give the title compound.

5-chlorothianaphthene, as well as the 5, 6 and 7-methylthianaphthenes, is described in Chemical Abstracts 47, 12346 gh.

(B) p-Fluorophenyl lithium

To a suspension of 6.9 g. (1 gram-atom) of lithium in 400 ml. of dry ether, under nitrogen, is added 2–3 ml. of a solution of 87.5 g. (0.5 mole) of dry p-fluorobromobenzene in 100 ml. of ether. The remainder is added slowly maintaining a gentle reflux and the mixture is stirred until all the lithium disappears. The resulting ethereal solution of p-fluorophenyl lithium is then used directly.

(C) 3-(p-fluorophenyl)-nortropine

A solution of 69.5 g. (0.5 mole) of tropinone in 250 ml. of ether is added dropwise to a solution of 0.5 mole of p-fluorophenyl lithium in 500 ml. of ether under nitrogen. The mixture is refluxed for five minutes, cooled with ice and stirred while 1 N hydrochloric acid is added slowly. The acid layer is washed with ether, made basic with sodium hydroxide solution and extracted with ether to give 3-(p-fluorophenyl)-tropine.

To a stirred solution of 2.6 g. (0.024 mole) of cyanogen bromide in 75 ml. of dry benzene heated at 50–55° C. is added a solution of 4.5 g. (0.02 mole) of 3-(p-fluorophenyl)-tropine in 50 ml. of dry benzene slowly. The resulting mixture is stirred and heated for five hours, filtered, extracted with dilute acid, and the dried extract is evaporated. The residue is taken up in acetone and the solution is diluted with water to give the 8-cyano-3-(p-fluorophenyl)-nortropine.

The above cyano derivative is hydrolyzed in sodium hydroxide solution by heating at reflux for 20 hours, concentrating the reaction mixture and extracting to give 3-(p-fluorophenyl)-nortropine.

The following known phenyl lithium derivatives are similarly reacted with tropinone to yield corresponding 3-substituted phenyl nortropine derivatives: o-tolyl, m-tolyl, p-tolyl, p-chlorophenyl, p-bromophenyl, o-anisyl, m-anisyl, p-anisyl and m-trifluoromethylphenyl.

EXAMPLE 1

A mixture of 5.2 g. (0.025 m.) of 3-(3-thianaphthenyl)-propionic acid and 15 ml. (0.025 m.) of thionyl chloride is allowed to stand at room temperature overnight, diluted with benzene and evaporated in vacuo to give the acid chloride.

To a solution of 9.2 g. (0.0454 m.) of 3-phenylnortropine in 500 ml. of hot toluene is added slowly, with stirring, a solution of the above prepared acid chloride (0.025 m.) in 100 ml. of dry toluene. The resulting mixture is stirred and refluxed for seven hours and filtered hot to remove 3-phenylnortropine hydrochloride. The filtrate is washed with water, dilute acid, base and saturated saline solution, dried and evaporated to yield 3-phenyl-8-[3-(3-thianaphthenyl)-propionyl]-nortropine, M.P. 163–167° C.

A mixture of 3.0 g. (0.0143 m.) of lithium aluminum hydride in 600 ml. of dry ether is stirred while 5.8 g. (0.0143 m.) of the above prepared nortropine in 50 ml. of dry tetrahydrofuran is added slowly. The resulting mixture is stirred and refluxed for four hours and allowed to stand at room temperature overnight. The mixture is filtered and the dried filtrate evaporated in vacuo to give 3-phenyl-8-[3-(3-thianaphthenyl)-propyl]-nortropine; hydrochloride, M.P. 262.5–263.5° C.

EXAMPLE 2

To a stirred mixture of 5.38 g. of 56.1% NaH in mineral oil (0.0125 mole of NaH) in 75 ml. of dimethyl sulfoxide is added dropwise 20.1 g. (0.125 mole) of diethyl malonate in 20 ml. of dimethyl sulfoxide. The mixture is stirred in a hot water bath for a half hour, cooled to room temperature, and a solution of 13.67 g. (0.063 mole) of 5-chloro-2-chloromethylthianaphthene in 50 ml. of dimethyl sulfoxide added. The mixture is stirred on the steam bath for 1 hour, cooled, and poured into water. The mixture is then extracted with ether, and the ethereal extracts washed, dried, and evaporated. The residue is dissolved in acetonitrile, washed with petroleum ether, the petroleum ether solution washed with acetonitrile, and the combined acetonitrile solutions evaporated. The residue is distilled, the distillate up to 180°/0.5 mm. being discarded. The product diethyl (5-chloro-2-thianaphthenylmethyl)malonate distills at 180–202°/0.5 mm.

A mixture of 8.3 g. (0.0244 mole) of the above malonate, 9.5 g. of KOH, 15 ml. of water, and 100 ml. of ethanol are refluxed with stirring overnight. The mixture is diluted with water and concentrated in vacuo to remove the alcohol. The residue is then diluted with water and ether, and the layers separated. The aqueous solution is washed with ether, the ether washed with water; the aqueous solution is acidified with HCl and extracted with ether. The ethereal extracts are dried and evaporated to give the (5-chloro-2-thianaphthenylmethyl)malonic acid, M.P. 194–196°.

The above malonic acid (6.5 g., 0.0229 mole) is heated in an oil bath to 240°, and kept at 210–230° for 1 hour. The resulting 3 - (5-chloro - 2 - thianaphthenyl) propionic acid, when cooled, solidifies and melts at 135–145°.

Following the procedures of Example 1, the propionic acid derivative is treated with thionyl chloride and the resulting acid chloride is condensed with 3-phenylnortropine to give 3-phenyl-8-[3-(5-chloro-2-thianaphthenyl)-propionyl]-nortropine. The latter is reduced with lithium aluminum hydride to yield 3-phenyl-8-[3-(5-chloro-2-thianaphthenyl)-propyl]-nortropine.

EXAMPLE 3

To 250 ml. of absolute ethanol is added 4.6 g. (0.2 mole) of sodium cut into pieces. This mixture is stirred for one-half hour and 35.3 g. (0.22 mole) of diethyl malonate is then added. The mixture is then stirred and refluxed for 2 hours and a solution of 1.82 g. (0.1 mole) of 2-chloromethylthianaphthene in 90 ml. of dry ether is added. The ether is boiled off and the remaining solution is refluxed overnight. The reaction mixture is poured into ice water and extracted with ether. The ether extracts are washed, dried, and evaporated, and the residue is distilled. The forerun distilling up to 170°/0.5 mm. is discarded. The fraction boiling at 170–176°/0.5 mm. is collected and is diethyl (2-thianaphthenylmethyl)malonate.

A solution of 11.0 g. (0.0359 mole) of the above malonate and 15 g. of KOH in 500 ml. of ethanol and 50 ml. of water is refluxed with stirring for 4 hours and then evaporated in vacuo. The residue is dissolved in water, washed with ether, the ether washings being then washed with water, and the combined aqueous solutions acidified with HCl. The acidic solution is extracted with ether and the ether extracts washed, dried, and evaporated to give (2-thianaphthenylmethyl)malonic acid, M.P. 181–183°.

The above malonic acid (7.6 g., 0.031 mole) is heated in an oil bath at 230–250° for one-half hour and the melt is cooled to give 3-(2-thianaphthenyl)propionic acid.

Following the procedures of Example 1, this acid is converted to the acid chloride, reacted with 3-phenylnortropine and the resulting amide is reduced to furnish 3-phenyl-8-[3-(2-thianaphthenyl)-propyl]-nortropine.

EXAMPLE 4

To a stirred mixture of 19.2 g. of 56.1% NaH in mineral oil (10.7 g., 0.444 mole of NaH) in 265 ml. of dimethyl sulfoxide is added dropwise a solution of 7.15 g. (0.444 mole) of diethyl malonate in 70 ml. of dimethyl sulfoxide. The mixture is then stirred in a hot water bath for 1 hour and cooled to room temperature. A solution of 37.3 g. (0.224 mole) of 2-chloromethylbenzofuran in 150 ml. of dimethyl sulfoxide is added dropwise, the mixture is refluxed with stirring for 1 hour, and is then poured into water-ether. The layers are separated, the aqueous solution is washed with ether, and the combined ether extracts are washed, dried and evaporated in vacuo. The residue is dissolved in acetonitrile and washed with petroleum ether, the petroleum ether solution extracted with acetonitrile, and the combined acetonitrile extracts evaporated in vacuo. The residue is distilled through a silvered column and the material distilling at 143°/0.5 mm. collected. This compound is diethyl (2-benzofuranylmethyl)malonate.

A mixture of 31.9 g. of KOH in 50 ml. of water and 31.9 g. (0.11 mole) of this malonate ester in 500 ml. of alcohol is stirred and refluxed for 3 hours and then evaporated in vacuo. The residue is dissolved in water and the aqueous solution washed with ether and acidified with concentrated HCl. The acid solution is extracted with ether and the ethereal extracts washed, dried, and evaporated to give (2-benzofuranylmethyl)malonic acid, M.P. 171–172°.

This acid (12.5 g., 0.0535 mole) is heated in an oil bath to 260° and allowed to cool, the product being 3-(2-benzofuranyl)-propionic acid, M.P. 109–112° C.

Following the procedures of Example 1, the propionic acid is reacted with thionyl chloride and the resulting acid chloride is condensed with 3-phenylnortropine to give 3-phenyl-8[3-(2-benzofuranyl)-propionyl]-nortropine. The amide is similarly reduced with lithium aluminum hydride to yield 3 - phenyl-8-[3-(2-benzofuranyl)-propyl]-nortropine.

EXAMPLE 5

The procedures of Examples 1, 2, 3 or 4 are followed. 3-chloromethylbenzofuran is condensed with sodio diethyl malonate to give diethyl (3-benzofuranylmethyl)malonate. The malonate is hydrolyzed to the diacid with aqueous KOH, monodecarboxylated by heating to give the propionic acid, and 3-phenylnortropine is added to the corresponding acid chloride to give a propionamide. The amide is reduced with LiAlH$_4$ to the product, 3-phenyl-8-[3-(3-benzofuranyl)-propyl]-nortropine.

EXAMPLE 6

The procedure of Example 1 is followed. 3-(3-thianaphthenyl)propionic acid is converted to its acid chloride and then the chloride allowed to react with 3-(p-chlorophenyl)-nortropine to give an amide, which is reduced with LiAlH$_4$ to give the product, 3-(p-chlorophenyl)-8-[3-(3-thianaphthenyl)-propyl]-nortropine.

Use of 3-(p-tolyl)-nortropine or 3-(m-trifluoromethylphenyl)-nortropine in the above procedure instead of 3-(p-chlorophenyl)-nortropine results in the formation of 3-(p-tolyl)-8-[3-(3-thianaphthenyl)propyl]-nortropine or 3 - (p - trifluoromethylphenyl)-8-[3-(3-thianaphthenyl) propyl]-nortropine, respectively.

Use of 3-(p-bromophenyl)-nortropine or 3-(o-tolyl)-nortropine in the above procedure instead of 3-(p-chlorophenyl)-nortropine results in the formation of 3-(p-bromophenyl) - 8 - [3-(3-thianaphthenyl)propyl]-nortropine or 3 - (o - tolyl) - 8-[3-(3-thianaphthenyl)propyl]-nortropine, respectively.

Use of fluoro or methoxy substituted phenylnortropines results in the formation of the corresponding fluoro or methoxy substituted products.

EXAMPLE 7

The procedures of Examples 1, 2, 3 or 4 are followed. 6-fluoro-3-chloromethylthianaphthene is condensed with sodio diethyl malonate to give diethyl (6-fluoro-3-thianaphthenylmethyl)malonate. The malonate is hydrolyzed to the diacid with aqueous KOH, the diacid monodecarboxylated by heating, the resulting propionic acid is converted to the acid chloride and 3-(p-chlorophenyl)-nortropine is added to give a propionamide. Reduction of the amide with LiAlH$_4$ gives the product 3-(p-chlorophenyl) - 8 - [3 - (6 - fluoro-3-thianaphthenyl)-propyl]-nortropine.

Use of 6-chloro-3-chloromethylthianaphthene as starting material instead of 6 - fluoro - 3-chloromethylthianaphthene results in the formation of 3-(p-chlorophenyl)-8-[3-(6-chloro-3-thianaphthenyl)propyl]-nortropine.

Use of 6-trifluoromethyl-3-chloromethylthianaphthene, 5-methyl-3-chloromethylthianaphthene, 5-butyl-2-chloromethylthianaphthene, 6 - bromo - 3-chloromethylbenzofuran, 6 - methoxy - 2-chloromethylthianaphthene, or 6-butoxy-2-chloromethylbenzofuran as starting material instead of 6-fluoro-3-chloromethylthianaphthene results in the formation of 3 - (p-chlorophenyl)-8-[3-(6-trifluoromethyl - 3 - thianaphthenyl)propyl] - nortropine, 3-(p-chlorophenyl) - 8 - [3 - (5 - methyl - 3-thianaphthenyl) propyl]-nortropine, 3 - (p - chlorophenyl)-8-[3-(5-butyl-2 - thianaphthenyl)propyl] - nortropine, 3 - (p - chlorophenyl) - 8 - [3 - (6 - bromo - 3 - benzofuranyl)-propyl]-nortropine, 3 - (p - chlorophenyl) - 8 - [3-(6-methoxy-2-thianaphthenyl)propyl]nortropine, or 3-(p-chlorophenyl)-8 - [3 - (6 - butoxy-2-benzofuranyl)propyl]-nortropine, respectively.

Use of 3-(p-fluorophenyl)-nortropine in the above procedure instead of 3-(p-chlorophenyl)-nortropine results in the formation of 3-(p-fluorophenyl)-8-[3-(6-fluoro-3-thianaphthenyl)-propyl]-nortropine.

EXAMPLE 8

Following the procedures of Example 1, thianaphthene-3-acetic acid is reacted with thionyl chloride and the resulting acid chloride is treated with 3-phenylnortropine to give 3-phenyl-8-[2-(3-thianaphthenyl)-acetyl]-nortropine. This amide is reduced as described above with lithium aluminum hydride to yield 3-phenyl-8-[2-(3-thianaphthenyl)-ethyl]-nortropine.

EXAMPLE 9

To a stirred mixture of 78 g. of 57% NaH in mineral oil (44.5 g., 1.856 moles of NaH) in 1150 ml. of dry dimethyl sulfoxide, maintained in ice at 25–30°, is added dropwise a solution of 297 g. (1.856 moles) of diethyl malonate in 230 ml. of dimethyl sulfoxide. The resulting solution is stirred in a hot water bath at 50–60° for an hour and then cooled to room temperature, after which a solution of 170.0 g. (0.93 mole) of 3-chloromethylthianaphthene in 150 ml. of dry dimethyl sulfoxide is added dropwise. The resulting solution is heated on the steam bath for an hour, cooled, and poured into ice water. The mixture is extracted with ether, and the extracts washed, dried, and evaporated. The residue is distilled under vacuum, the fractions distilling at 123–232°/0.4 mm. being diethyl (3-thianaphthenylmethyl) malonate.

A solution of 200 g. of KOH, 200 g. of water, and 131.2 g. (0.428 mole) of the above malonate in 2000 ml. of alcohol is stirred and refluxed for 4 hours and evaporated in vacuo. The residue is dissolved in water and washed with ether. The aqueous solution is cooled, acidified with concentrated HCl, and extracted with ether. The ethereal extracts are washed, dried, and evaporated in vacuo, and the residue triturated with hexane to give (3-thianaphthenyl) malonic acid, M.P. 170–171° dec.

The above malonic acid (17.5 g., 0.07 mole) is heated in an oil bath to ca. 250° and then at 230° for 1 hour. The melt is allowed to cool following the decarboxylation and 40 ml. of SOCl$_2$ added. After being allowed to stand overnight at room temperature, the mixture is refluxed on the steam bath for one-half hour and then evaporated in vacuo, benzene being added to the residue to eliminate traces of SOCl$_2$. The residue is the acid chloride of 3-(3-thianaphthenyl)-propionic acid.

A solution of diazomethane is prepared as follows: To an unscratched 2 liter Erlenmeyer flask on a magnetic stirrer with a Teflon bar immersed in a salt-ice bath is added 75 ml. of 50% KOH and 200 ml. of ether. When the internal temperature of the mixture is below 0°, 29.4 g. (0.2 mole) of N-methyl-N'-nitro-N-nitrosoguanidine is added in small portions such that the internal temperature remains below 5°. The cold mixture is stirred in a salt-ice bath for 5 minutes and allowed to settle, and the ether solution decanted into an unscratched 2 l. Erlenmeyer flask containing KOH pellets and cooled in ice. The reaction mixture is extracted with 6–100 ml. portions of cold ether, the ether extracts dried in an ice bath with KOH pellets for one-half hour, and then filtered into an unscratched 2 liter filter flask in an ice bath, equipped with a magnetic stirrer. The solution is stirred in ice while a solution of 15.7 g. (0.07 mole) of the above acid chloride in a small amount of methylene chloride is added dropwise, nitrogen being evolved. The resulting solution is allowed to stand overnight, the ice bath being allowed to warm to room temperature and the solution is evaporated in vacuo using a hot water bath, a hood, and a safety shield, to leave as the residue 1-diazo-4-(3-thianaphthenyl)-2-butanone.

To a mixture of 16.0 g. (0.079 mole) of 3-phenylnortropine in ca. 300 ml. of dioxane which has been heated to achieve partial solution and then cooled to room temperature, is added a solution of 16.1 g. (0.07 mole) of the above diazoketone in 100 ml. of dioxane, followed by 2.0 g. of Ag₂O. The mixture is stirred in a water bath at 60–70° for one-half hour, nitrogen being evolved. An additional 0.5 g. of Ag₂O is added, followed by heating at 60–70° for one-half hour and a final 0.5 g. portion of Ag₂O added and heated The mixture is allowed to stand overnight at room temperature and then filtered through Super-Cel, and the filtrate evaporated in vacuo. The residue is dissolved in methylene chloride, and washed with acid, base, and water, and evaporated in vacuo to give 3-phenyl-8-[4-(3-thianaphthenyl)-butyryl]-nortropine.

The above prepared amide is reduced as described in Example 1 with lithium aluminum hydride to yield 3-phenyl-8-[4-(3-thianaphthenyl)-butyl]-nortropine.

EXAMPLE 10

When 6-methoxy - 3 - benzofuranbutyric acid and 5-methoxy-3-thianaphthenebutyric acid are substituted for the thianaphthene-3-acetic acid in the procedure of Example 8, and the acid chloride formation, amide formation, and reduction are carried out as described therein, 3-phenyl - 8 - [4-(6-methoxy - 3 - benzofuranyl)-butyl]-nortropine and 3-phenyl-8-[4 - (5-methoxy-3-thianaphthenyl)butyl]-nortropine, respectively, are obtained.

EXAMPLE 11

A solution of 4.5 g. (0.012 mole) of 3-phenyl-8-[3-(3-thianaphthenyl)propyl]-nortropine and 2 or 3 drops of conc. H₂SO₄ in 100 ml. of acetic anhydride is stirred on the steam bath for 3 hours and evaporated in vacuo. The residue is warmed and stirred with 5% Na₂CO₃, then cooled, and methylene chloride added. The layers are separated and the aqueous layer washed with methylene chloride. The organic extracts are washed, dried, and evaporated in vacuo to give 3-phenyl-8-[3-(3-thianaphthenyl)-propyl]-nortropine O-acetate.

EXAMPLE 12

To a solution of 7.25 g. (0.0193 mole) of 3-phenyl-8-[3-(3-thianaphthenyl)propyl]-nortropine in 250 ml. of dry benzene is added a solution of 1.8 g. (0.0193 mole) of propionyl chloride in 50 ml. of dry benzene, and the cloudy solution is stirred and refluxed for 1 hour and allowed to stand at room temperature overnight. The mixture is filtered and the filtrate evaporated in vacuo to give 3-phenyl-8-[3-(3-thianaphthenyl)propyl] - nortropine O-propionate.

EXAMPLE 13

A mixture of 1.7 g. (0.00411 m.) of 3-phenyl-8-[3-(3-thianaphthenyl)-propyl]-nortropine hydrochloride in 50 ml. of concentrated hydrochloric acid is stirred and refluxed for three hours, diluted with methanol and benzene, and evaporated in vacuo to yield 3-phenyl-8-[3-(3-thianaphthenyl) - propyl] - nortropidine hydrochloride, M.P. 192–194° C. The free base is obtained in the usual manner.

When the following nortropines are dehydrated according to the above procedure, the corresponding listed nortropidines are obtained.

Nortropine 3-phenyl-8-[3-(5-chloro-2-thianaphthenyl)-propyl]-nortropine
3-phenyl-8-[3-(2-thianaphthenyl)-propyl]-nortropine
3-phenyl-8-[3-(2-benzofuranyl)-propyl]-nortropine
3-phenyl-8-[2-(3-thianaphthenyl)-ethyl]-nortropine
3-phenyl-8-[4-(3-thianaphthenyl)-butyl]-nortropine Nortropidine 3-phenyl-8-[3-(5-chloro-2-thianaphthenyl)-propyl]-nortropidine
3-phenyl-8-[3-(2-thianaphthenyl)propyl]-nortropidine
3-phenyl-8-[3-(2-benzofuranyl)-propyl]-nortropidine
3-phenyl-8-[2-(3-thianaphthenyl)-ethyl]-nortropidine
3-phenyl-8-[4-(3-thianaphthenyl)-butyl]-nortropidine

What is claimed is:
1. A compound of the formula:

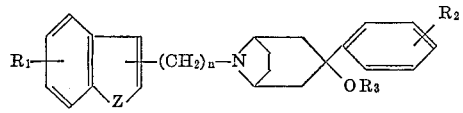

or a pharmaceutically acceptable acid addition salt thereof, wherein:

$R_1$ and $R_2$ are each hydrogen, chloro, bromo, fluoro, trifluoromethyl, methyl or methoxy;
$R_3$ is hydrogen or lower alkanoyl up to 4 carbon atoms;
Z is sulfur; and
n is a positive integer from 2 to 4.

2. A compound according to claim 1 in which the thianaphthenyl moiety is 3-substituted and n is 3.

3. A compound according to claim 1 in which $R_1$ is hydrogen, chloro or fluoro at the 5 or 6-position; $R_2$ is hydrogen, chloro or fluoro at the p-position; and $R_3$ is hydrogen or acetyl.

4. A compound according to claim 1 in which $R_1$, $R_2$ and $R_3$ are all hydrogen, being the compound 3-phenyl-8-[3-(3-thianaphthenyl)-propyl]-nortropine or its hydrochloride salt.

5. A compound of the formula:

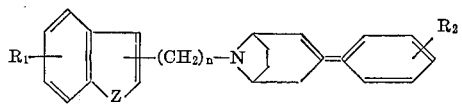

or a pharmaceutically acceptable acid addition salt thereof, wherein:

$R_1$ and $R_2$ are each hydrogen, chloro, bromo, fluoro, trifluoromethyl, methyl or methoxy;
Z is sulfur; and
n is a positive integer from 2 to 4.

6. A compound according to claim 5 in which the thianaphthenyl moiety is 3-substituted and n is 3.

7. A compound according to claim 6 in which $R_1$ and $R_2$ are both hydrogen, being the compound 3-phenyl-8-[3-(3-thianaphthenyl) - propyl] - nortropidine or its hydrochloride salt.

8. A compound of the formula:

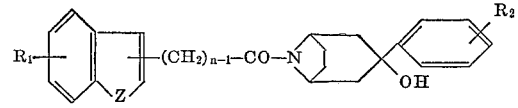

wherein:

$R_1$ and $R_2$ are each hydrogen, chloro, bromo, fluoro, trifluoromethyl, methyl or methoxy;
Z is sulfur; and
n is a positive integer from 2 to 4.

References Cited

UNITED STATES PATENTS 3,324,137   6/1967   Zenitz _____ 260—292
3,365,457   1/1968   Zenitz _____ 260—292

ALAN L. ROTMAN, Primary Examiner

U.S. Cl. X.R.

260—330.5, 346.2, 999